July 2, 1963  R. SIEGEL  3,095,641

METHOD FOR MAKING A HANDLE

Filed May 10, 1960

INVENTOR.
Rubin Siegel
BY
*Irving Seidman*
ATTORNEY

United States Patent Office 3,095,641
Patented July 2, 1963

3,095,641
METHOD FOR MAKING A HANDLE
Rubin Siegel, Cedarhurst, N.Y., assignor to A. Siegel Handles, Inc., New York, N.Y., a corporation
Filed May 10, 1960, Ser. No. 28,051
5 Claims. (Cl. 29—411)

The present invention relates to a process for making a handle for use on handbags, valises, and the like.

A handle of the type used on ladies' handbags, and the like, receives most of its wear at its extremities where it is attached to the mounting rings which, in turn, secure the handle to the handbag. In order to extend the life of the handle it is necessary to reinforce it at the points of stress mentioned. However, since a good appearance plays an important part in the saleability of a handbag, the reinforcing must be unobtrusive so as not to detract from the bag's appearance. In addition, the reinforcing member should not impart a rigidity along the entire length of the handle for two reasons. First, the handle may feel uncomfortable to grip, and second, the stiffness may be discordant with certain soft style effects.

It is, therefore, an object of the present invention to provide a process for making a handle which will meet the foregoing requirements.

It is another object of the present invention to provide a process for making a handle which will be simple and economical for commercial production.

Additional advantages of the present invention will become apparent in the following description and drawings in which.

Figure 1:
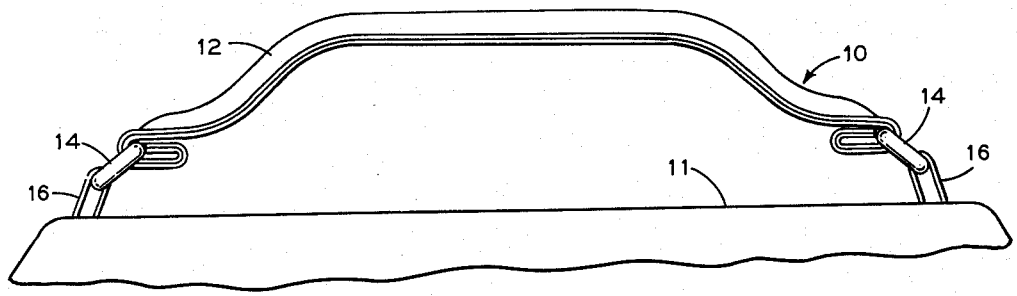
FIG. 1 is a front view of the handle of the present invention when attached to a handbag, or other article.

In FIG. 1 there is shown a handle assembly, indicated generally by reference numeral 10, which is attached to a handbag 11. The handle assembly 10 includes a handle 12 and a pair of mounting rings 14. The mounting rings 14 are loosely held within channels 16 to permit pivotal movement with respect to the handbag.

Figure 2:
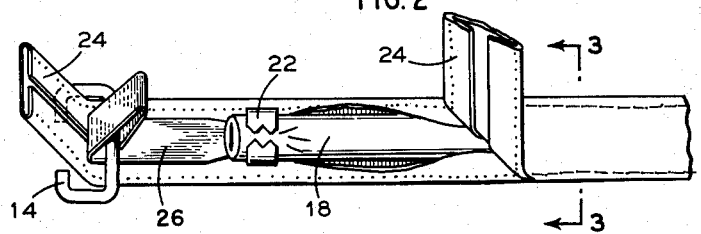
FIG. 2 is a partial view of the handle with part of the cover lifted away.
Figure 4:
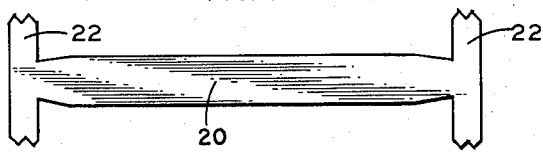
FIG. 4 is a plan view of the reinforcing member of the present invention.
Figure 3:
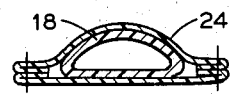
FIG. 3 is a cross-sectional view taken along the line 3—3 in FIG. 2.

The handle 12, a portion of which is shown in greater detail in FIGS. 2 and 3, has an insert member 18 which extends along the length of the central portion of the handle 12. The insert member 18 gives "body" without stiffness to the handle and may be made of a tubular piece of rubber or plastic. In the illustrated handle, the insert member 18 has a cross-section with a flat bottom and a rounded top to impart a similar cross-section to the handle. Obviously, an insert member having any desired cross-section may be used to impart any desired shape to the handle.

Figure 5:
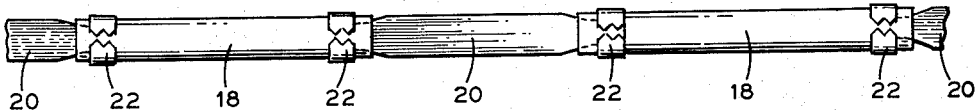
FIG. 5 is a plan view of a series of handle insert members linked together by reinforcing members prior to being covered and cut apart.

In commercial production, a plurality of insert members 18 are alternated with reinforcing members 20 to make a continuous strip, as shown in FIG. 5. Each reinforcing member 20 is made of a flat strip of sheet material which is provided with a gripping terminal 22 extending transversely of the length of the strip at each end thereof. The gripping terminal 22 is bent into an arc above the plane of the metal strip preparatory to receiving the insert member 18. The gripping terminals 22 are then clamped together to grasp the insert members 18. The entire strip is encased within material such as leather, plastic, or fabric to form a cover 24. In the embodiment shown, the cover 24 comprises top and bottom strips with their side edges folded in making a total of four thicknesses. The cover 24 is then stitched through the four thicknesses on each side of the strip.

The covered strip is now divided into separate handles by chopping with a cutting die at the center of each reinforcing member 20 so that each end of the handle is provided with a reinforcing section 26.

The handle 12 is attached to the rings 14 by a fixture or jig which loops each end portion, containing the reinforcing section 26, through its respective ring 14. It is then doubled back against itself to form an ear. It is preferable to make the reinforcing member 20 of metal because of the strength of this material and because metal can be bent and will retain a sharply folded neat appearance about the mounting ring 14.

It has been shown, then, that the present invention provides a handle for a handbag or a valise which is particularly strong at the extremities which receive the greatest wear. The handle is easily manufactured under the modern mass production method described herein and can, therefore, be economically made. In addition, the reinforcement of the handle is accomplished inconspicuously and will not alter the appearance of the handle.

While a specific embodiment of the invention has been shown and described in detail to illustrate the application of the invention, it will be understood that the invention may be embodied otherwise without departing from such principles.

What is claimed is:

1. The method of making handles which comprises attaching a bendable reinforcing member between each of a plurality of longitudinally spaced insert members to make a continuous strip, encasing the continuous strip in a continuous outer cover, and cutting the strip in approximately the center of each of the reinforcing members to form a handle with covered reinforcing sections at each end.

2. The method of making handles which comprises attaching a bendable reinforcing member between each of a plurality of longitudinally spaced insert members to make a continuous strip, encasing the continuous strip in a continuous outer cover, cutting the strip in approximately the center of each of the reinforcing members to form a handle with covered reinforcing sections at each end, and bending each reinforced end to loop through a mounting ring for attachment thereto.

3. The method of making handles which comprises positioning a bendable reinforcing member having gripping terminals extending transversely of the length of the members between each of a plurality of longitudinally spaced insert members, clamping said terminals on said insert members to make a continuous strip, encasing the continuous strip in a continuous outer cover, cutting the strip in approximately the center of each of the reinforcing members to form a handle with covered reinforcing sections at each end, and bending each reinforced end to loop through a mounting ring for attachment thereto.

4. The method of making handles which comprises positioning a bendable reinforcing member between each of a plurality of longitudinally spaced insert members to make a continuous strip, said insert members having a cross-section with a flat bottom and a rounded top, said reinforcing members having gripping terminals extending transversely of the length of the members at each end thereof, clamping said terminals on said insert members, encasing the continuous strip in a continuous outer cover, cutting the strip in approximately the center of each of the reinforcing members to form a handle with covered reinforcing sections at each end, and bending each reinforced end to loop through a mounting ring for attachment thereto.

5. The method of making handles which comprises positioning a bendable metal reinforcing member between each of a plurality of longitudinally spaced flexible insert members to make a continuous strip, said insert members having a cross-section with a flat bottom and a rounded top, said reinforcing members having gripping terminals extending transversely of the length of the members at each end thereof, clamping said terminals on said insert members, placing said continuous strip between top and bottom cover strips having their side edges folded in, stitching the cover strips together along each side edge, cutting the covered strip in approximately the center of each of the reinforcing members to form a handle with covered reinforcing sections at each end, and bending each reinforced end to loop through a mounting ring for attachment thereto.

References Cited in the file of this patent

UNITED STATES PATENTS

| | | |
|---|---|---|
| 129,910 | Topham | July 30, 1872 |
| 380,134 | Reynolds et al. | Mar. 27, 1888 |
| 1,639,574 | Reiter | Aug. 16, 1927 |
| 1,690,865 | Kondolf | Nov. 6, 1928 |
| 2,033,879 | Cichowicz | Mar. 10, 1936 |
| 2,736,956 | Stahl et al. | Mar. 6, 1956 |
| 2,852,114 | Heit | Sept. 16, 1958 |